United States Patent [19]

Yotsutsuji et al.

[11] 4,171,941

[45] Oct. 23, 1979

[54] GATE OF MOLD FOR INJECTION MOLDING MACHINE

[75] Inventors: Akira Yotsutsuji; Seiichi Ueda, both of Nara; Kiyosi Uemura, Sakai, all of Japan

[73] Assignee: Osaka City, Osaka, Japan

[21] Appl. No.: 870,499

[22] Filed: Jan. 18, 1978

[51] Int. Cl.² ................................................ B29F 1/05
[52] U.S. Cl. .................................... 425/146; 239/135; 425/563; 425/566
[58] Field of Search ............... 425/566, 572, 146, 129, 425/DIG. 229, 570, 562; 239/135; 137/455; 425/563, 564

[56] References Cited

U.S. PATENT DOCUMENTS

| | | | |
|---|---|---|---|
| 2,842,160 | 7/1958 | Rekettye | 425/570 X |
| 3,348,520 | 10/1967 | Lockwood | 239/135 |
| 3,482,283 | 12/1969 | Korf | 425/129 |
| 3,973,892 | 8/1976 | Rees | 425/572 |

Primary Examiner—William R. Briggs
Attorney, Agent, or Firm—Oblon, Fisher, Spivak, McClelland & Maier

[57] ABSTRACT

A gate of a mold for an injection molding machine comprises a valve cone having a circular cone shape or a pyramid shape and a valve seat corresponding to the valve cone wherein the valve cone is pushed toward the valve seat by a spring in the direction reverse to the injecting direction.

4 Claims, 3 Drawing Figures

GATE OF MOLD FOR INJECTION MOLDING MACHINE

BACKGROUND OF THE INVENTION

1. Field of the Invention

The present invention relates to a gate of a mold for an injection molding machine wherein a molding compound is kept in a molten form in an inner passage and a molded product is ejected in a solidified or hardened form (hereinafter referred to as a runnerless mold).

2. Description of the Prior Art

In a hot runner molding method, a molten resin melted in an injection molding machine in a plastic form is fed into a hot runner of a mold kept at high temperature so as to keep the molding compound remaining in the runner part in a molten form, and the molten molding compound is injected at high velocity under high pressure through a gate at the end of the hot runner into a cavity of the cool mold, and the molded product is cooled and ejected. This method is advantageous from the viewpoint of labour saving and reduction of material loss because it is a runnerless molding. On the other hand, when a molding compound having a low melt flow viscosity is molded, leakage or threading of the melt is caused which prevents the automatic molding and renders damaged products.

Studies have been made to overcome these disadvantages by providing a valve mechanism in the hot runner to open the valve of the mechanism at the injection of the molten molding compound and to close the valve at the end of the injection. However, the conventional valve mechanism has a cylinder-piston structure for the guide in the opening and closing operation of the valve whereby the molten resin is easily immersed into the sliding gap causing troubles. Moreover, the disadvantage is the complicated structure and high production cost.

SUMMARY OF THE INVENTION

It is an object of the present invention to provide a gate of a runnerless mold for an injection molding having a trouble free valve mechanism without the above-mentioned disadvantage.

The foregoing and other objects of the present invention have been attained by providing a gate of a mold for an injection molding which comprises a valve cone having a trapezoidal profile with circular or polygonal base and a valve seat corresponding to the valve cone wherein the valve cone is pushed toward the valve seat by a spring in the direction reverse to the injecting direction.

BRIEF DESCRIPTION OF THE DRAWINGS

Various other objects, features and attendant advantages of the present invention will be more fully appreciated as the same becomes better understood from the following detailed description when considered in connection with the accompanying drawing, wherein like reference characters designate like or corresponding parts throughout the several views, and wherein.

DETAILED DESCRIPTION OF THE PREFERRED EMBODIMENT

Figure 1:
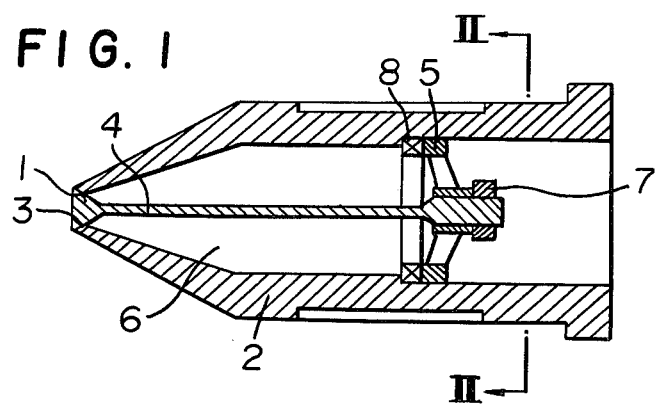
FIG. 1 is a sectional side view of one embodiment of the gate of the present invention.

The gate of the mold for the injection molding is formed by the valve cone having a trapezoidal profile with circular or polygonal base and the valve seat corresponding to the valve cone and the valve cone is pushed toward the valve seat by the spring in the direction reverse to the injection direction.

In the mold of the present invention, the injection pressure is applied to the valve cone at the time of injection of the molding compound forcing the valve cone away from the valve seat against the spring action which pushes the valve cone to the predetermined position, whereby the gate is formed by the gap between the valve cone and the valve seat, and the molten material is injected into the cavity. The gate is closed as soon as the total of the spring pressure and the pressure of the molten material injected into and filling the cavity exceeds the opposing valve gate opening-pressure of the melt resin.

In the valve mechanism in the gate of the present invention, the valve has a cone shape having a trapezoidal profile with circular or polygonal base, and the valve cone is pushed by the spring in the predetermined direction, whereby the seating contact of the valve cone with the valve seat at the closing of the gate can be attained in a self-aligning operation. Accordingly, there are substantially none of the troubles caused by the conventional apparatus, such as cut-off heating wires, stop of the molding operation due to solidification or hardening of the molding compound at the gate, leakage and threading of the molten material, and a shift of timings for the gate opening and closing steps, so that opening and closing of the gate can here be attained in the optimum conditions. Even though the valve is worn, sound function of the valve can be attained and the accurate operation of the valve can be maintained for a long time. Moreover, the structure is simple and the cost for preparing the mold is low, which is an advantage.

As described above, in accordance with the present invention, the perfect operation of the valve can be continued for a long time and the full automatic operation of the injection molding can be attained, advantageously.

In accordance with the studies of the inventors, it has been found out that the effect of the invention can be attained without any trouble even in the case of the injection moldings of various thermoplastic molding compounds comprising a large amount of an inorganic filler such as glass fiber. It was found that the gate of the present invention can be also operated without trouble even in the case of thermosetting resins except for the problem of its hardening in a passage other than the gate. The hardening in such a passage can be prevented by quality improvement or modification of the thermosetting resins.

In the injection molding operation, it is usual to attain the molding by two step switchings under the injection pressure and a subsequent lower secondary pressure. Accordingly, when the pressure is switched to the secondary pressure, the counter-flow of the molding compound from the cavity filled at high pressure can not be prevented whereby residual stress is easily caused near the gate because of the shortage of the molding compound and the shot-to-shot variation of weight and size of the molded products are caused and the counterflowed molding compound solidifies or hardens at the gate and causes damage of the molded products and trouble in the molding operation.

In accordance with the present invention, the closing of the gate by the valve cone is initiated just before or at the same time as switching to the secondary pressure whereby the above-mentioned disadvantages can be prevented, contributing to the improvement of quality of the molded products.

In accordance with the present invention, no counter-flow of the molding compound is caused, whereby the apparatus of the invention can be effectively applied for the injection compression-molding method. That is, if the mold is slightly opened at the injection of the molten material and the mold is closed after the injection, molded products of high quality equivalent to those of the compression molding can be obtained.

When a thermosetting resin comprising a large amount of a reinforcing material or a filler is molded by injection molding, the orientation of the reinforcing material or the filler is easily caused in the injection compression-molding thereby incurring damage of the molded products. When the gate of the present invention is used, the injection compression-molding can be easily attained.

In accordance with one preferred embodiment of the invention, a tip form of the valve gate can be used. In the other embodiment of the invention, the valve gate is built into the mold assembly instead of forming a separate tip.

Referring to the drawings, the preferred embodiments of the gate of the present invention will be described.

Figure 2:
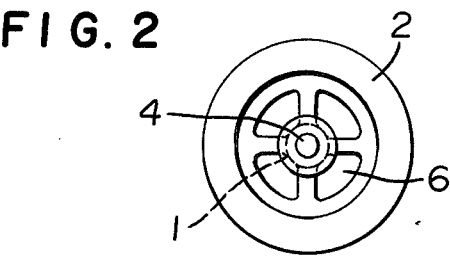
FIG. 2 is a sectional view taken along the line II-II in FIG. 1.

In FIGS. 1 and 2, the gate of the invention in the form of a tip separated from the mold is shown. In the embodiment, the valve cone (1) is in the form of the circular cone shape and it is contacted with the valve seat (3) formed at the front aperture of the tip body (2) under the pressure of the spring in the specific direction.

In the embodiment shown in FIGS. 1 and 2, the pressure of the spring can be applied by using a spring steel wire as the valve stem (4) and/or using a resilient material such as a spring steel as the supporter (5) to which the valve stem (4) is slidably coupled, for supporting the valve stem (4); if necessary, further using a waved spring (8) at the bottom of the supporter like a spreader (5). The pressure of the spring is set to be lower than the injection pressure.

In the valve gate tip of the present invention shown in FIGS. 1 and 2, the molding compound kept in the inner chamber (6) of the tip body (2), said inner chamber defining an injection passage, is injected into the cavity of the mold (not shown) through the gate having a gap formed between the valve cone (1) and the valve seat (3) by opening the valve cone (1) against the pressure of the spring of the valve stem (4) and/or the supporter (5) and the spring (8) at the bottom, by the injection pressure at the injection step.

When the cavity is filled with the injected resin, the pressure actuated to the surface of the valve cone (1) at the cavity side, rises so that the total pressure of the resin pressure and the pressure of the spring reaches higher than the injection pressure whereby the valve cone (1) is actuated to close the gate.

When the pressure of the spring is applied to the valve cone (1) only by the spring action of the valve stem (4) in the embodiment, the valve stem (4) can be held by inserting it in a hole formed at the front end of the inner chamber (6).

In the modifications and the embodiment shown in FIGS. 1 and 2, the pressure of the spring to the valve cone (1) given by the valve stem (4) can be adjusted with an adjusting nut (7), if necessary. The adjusting nut (7) also acts as a locking nut to prevent sliding movement between the valve stem (4) and the supporter (5) during the molding operation.

Figure 3:
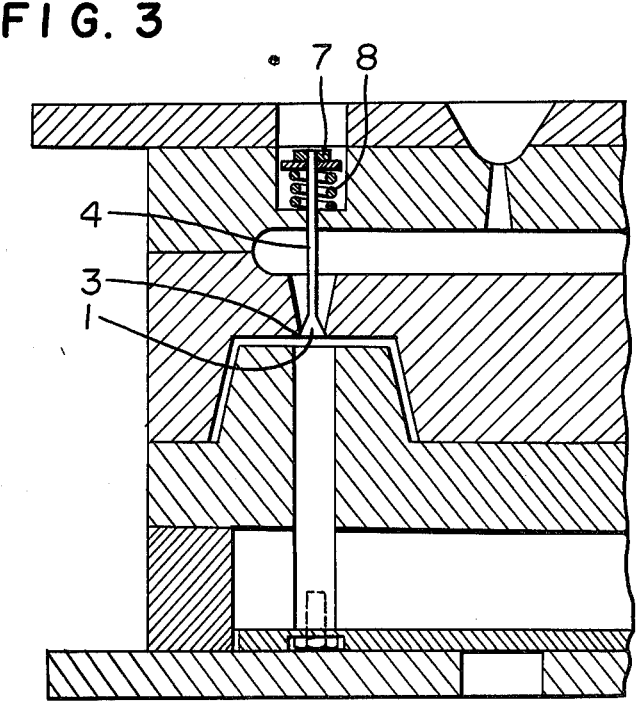
FIG. 3 is a sectional side view of the other embodiment of the gate of the present invention.

FIG. 3 shows the other embodiment combining the valve gate in the mold without forming it as a separate tip. The same reference numerals designate identical or corresponding parts in FIGS. 1 and 2.

The embodiment of FIG. 3 shows the principle that the three sheet type or other type molds can be easily modified to the runnerless mold by the valve gate of the invention.

For example, the three plate type mold can be modified to the heat insulation runner mold i.e. the runnerless mold, by enlarging the sectional area and assembling the valve structure of the invention by simple processing.

Obviously, many modifications and variations of the present invention are possible in light of the above teachings. It is therefore to be understood that within the scope of the appended claims, the invention may be practiced otherwise than as specifically described herein.

What is claimed is:

1. A gate of a runnerless mold for an injection molding device comprising:
    an injection mold tip body defining an injection passage;
    a valve seat formed at the front aperture of the tip body;
    a cone shaped valve having a trapezoidal profile, said valve being positionable adjacent said valve seat;
    an elongated valve stem having one end attached to the small end of said trapezoidal profile and extending into said tip body;
    valve support means connected to the other end of said valve stem and supporting said valve stem in said tip body, said valve support means being the only means contacting said valve stem along its length;
    spring means comprising said valve stem composed of a resilient material, said spring means acting to push the valve cone in a direction which is reverse to the injecting direction so as to seat said valve within said valve seat and said spring means being resiliently deformable to allow said valve to move from said valve seat.

2. A gate of a mold according to claim 1, wherein said valve support means comprises a resilient spreader and a waved spring.

3. A gate of a mold according to claim 1, wherein said means for connecting said valve stem to said valve support means includes an adjusting nut for setting the spring force.

4. A gate of a mold according to claim 3, wherein the valve stem and valve support means are connected in a sliding fit and wherein said adjusting nut acts as a locking nut to prevent sliding movement between the valve stem and valve support means.

* * * * *